United States Patent
Franklin

(10) Patent No.: US 10,823,453 B2
(45) Date of Patent: Nov. 3, 2020

(54) MARINIZED VAPORIZER UNITS, AND METHODS OF MAKING AND USING SAME

(71) Applicant: Atlantic, Gulf & Pacific Company of Manila, Inc., Muntinlupa (PH)

(72) Inventor: David Franklin, Katy, TX (US)

(73) Assignee: Atlantic, Gulf & Pacific Company of Manila, Inc., Manila (PH)

( * ) Notice: Subject to any disclaimer, the term of this patent is extended or adjusted under 35 U.S.C. 154(b) by 99 days.

(21) Appl. No.: 16/197,345

(22) Filed: Nov. 20, 2018

(65) Prior Publication Data

US 2019/0353396 A1    Nov. 21, 2019

Related U.S. Application Data

(60) Provisional application No. 62/630,218, filed on Feb. 13, 2018, provisional application No. 62/588,511, filed on Nov. 20, 2017.

(51) Int. Cl.

| | |
|---|---|
| *F24H 1/20* | (2006.01) |
| *F17C 7/04* | (2006.01) |
| *F24H 1/00* | (2006.01) |
| *B60K 15/077* | (2006.01) |
| *F02M 21/06* | (2006.01) |
| *F17C 9/02* | (2006.01) |

(52) U.S. Cl.
CPC .......... *F24H 1/206* (2013.01); *B60K 15/077* (2013.01); *F02M 21/06* (2013.01); *F17C 7/04* (2013.01); *F17C 9/02* (2013.01); *F24H 1/0072* (2013.01); *F17C 2221/033* (2013.01); *F17C 2227/0157* (2013.01); *F17C 2227/0304* (2013.01); *F17C 2227/0309* (2013.01); *F17C 2227/0316* (2013.01); *F17C 2227/0332* (2013.01); *F17C 2227/0393* (2013.01); *F17C 2265/032* (2013.01); *F17C 2265/036* (2013.01); *F17C 2270/0102* (2013.01); *F17C 2270/0121* (2013.01)

(58) Field of Classification Search
CPC ..... F24H 1/206; F24H 1/0072; B60K 15/077; F02M 21/06; F17C 9/02; F17C 7/04; F17C 2227/0332; F17C 2265/036; F17C 2227/0304; F17C 2227/0316; F17C 2265/032; F17C 2270/0102; F17C 2221/033; F17C 2227/0157; F17C 2227/0309; F17C 2227/0393; F17C 2270/0121; F17C 2265/05; F17C 223/0161; F17C 7/00; F28D 7/0083; F28D 15/00; F28D 7/085; F28D 7/06
See application file for complete search history.

(56) References Cited

U.S. PATENT DOCUMENTS 4,203,300 A * 5/1980 Hanson .................. B01D 1/00
122/33

* cited by examiner

*Primary Examiner* — Emmanuel E Duke
(74) *Attorney, Agent, or Firm* — J. M. (Mark) Gilbreth; Gilbreth & Assoc PC

(57) ABSTRACT

Floating marinized water bath vaporizer utilizing a slosh chamber having reduced water surface area to reduce the effects of wave created which the vaporizer is in motion, and systems utilizing such vaporizer, and to methods of making and using such vaporizer.

11 Claims, 13 Drawing Sheets

MARINIZED VAPORIZER UNITS, AND METHODS OF MAKING AND USING SAME

CROSS-REFERENCE TO RELATED APPLICATION DATA

This utility application claims priority to U.S. Provisional Patent Application Ser. No. 62/588,511 filed Nov. 20, 2017 and U.S. Provisional Patent Application Ser. No. 62/630,218 filed Feb. 13, 2018, with all of the foregoing applications herein incorporated by reference for all purposes.

BACKGROUND OF THE INVENTION

1. Field of the Invention

The present invention relates to LNG, and to methods and apparatus for processing LNG. In another aspect, the present invention relates to vaporizer units, to systems incorporating such vaporizer units, to methods of making and using such units and systems, and to methods of processing liquids using same. In even another aspect, the present invention relates to marinized vaporizer units, to floating storage and regas vessels/units (FSRU) incorporating such vaporizer units, to methods of making and using same, to methods of processing liquids utilizing such units, and to gases produced thereby. In even another aspect, the present invention relates to methods of modifying floating vessels, to methods of making and using same, to methods of processing liquids, and to gases produced thereby. In still another aspect, the present invention relates to methods of modifying an LNG Carrier into a floating storage and regas vessel, to methods of making and using same, to methods of processing LNG, and to LNG and/or natural gas produced thereby. In yet another aspect, the present invention relates to vaporizing units, to methods of making vaporizing units, and to methods of modifying vaporizing units, and to methods of using same, and to vaporized products produced therefrom.

2. Brief Description of the Related Art

The international LNG trade has evolved substantially since the first commercialization of shipping of LNG from Algeria to the UK in 1964. Massive, large scale, LNG liquefaction facilities have been built in Trinidad, Africa, Middle East, Australia, Russia, Norway and now in the U.S. the shale gas revolution. In the past, the massive and costly LNG liquefaction facilities have been underpinned by long term take-or-pay contracts with large utility companies in Japan, Korea and several European countries. The price of LNG was indexed to the price of oil. This arrangement made the commodity price of LNG very volatile and significant hedging was required to manage price risk.

LNG is traditionally transferred from the liquefaction facility to large LNG carrier ships (LNGC) and transported to remote markets. The LNG is then transferred from LNG carrier ships (LNGC) to large, onshore, storage tanks at LNG import facilities. The LNG import facility is equipped with pumps that deliver LNG to vaporizers (special heat exchangers) at high pressure. The LNG is heated to near ambient conditions in the vaporizers and sent to various gas customers through pipelines.

Various methods of heating the LNG have been used at these onshore facilities including:

A. Open rack vaporizers (ORV): LNG is vaporized in vertical fin tubes by direct contact with warm seawater deluged over the outside of fin tubes.

B. Submerged combustion vaporizers (SCV): A small amount of natural gas is consumed as fuel and the hot exhaust gas is directly injected into a bath of water to heat the bath. LNG is vaporized in a separate tube bundle in the bath as the heat is transferred from the water to the tube bundle. The bath of an SCV absorbs the CO2 and NOX from the combustion gases and slowly reducing the pH, making the water acidic. Caustic is added to buffer and neutralize the acid. Salts are created in the neutralization process. Water from the combustion products is also condensed in the bath. The excess salty water is removed, treated and sent to the environment.

C. Water bath vaporizers (WBV): LNG is indirectly heated in tub bundles immersed in a tank of water of water. The water is heated indirectly using burners and firetubes. WBVs are not as efficient as SCVs, but they have found extensive at many, small scale gas utilities desiring on-demand vaporizing capacity. Unlike the SCVs, the water in the WBVs never comes in contact with the combustion products. The water quality in the bath is not affected by the heating process. Water treatment and environmental issues are eliminated.

A typical water bath vaporizer is illustrated in U.S. Pat. No. 4,203,300, issued May 20, 1980, to Hanson et al., showing a horizontal direct fired water bath propane vaporizer.

More specifically, U.S. Patent Publication No. 20170067373, published Mar. 9, 2017 by Allam et al., discloses an integrated power generating system and method and liquefied natural gas (LNG) vaporization system and method. Referring now to Allam Publication '373 at ¶[0059], a conventional LNG re-gasification system generally utilizes a multistage centrifugal pump to pump the LNG to a high pressure after which it is vaporized in a water bath heat exchanger that is heated by burning natural gas. In the example shown in Allam's FIG. 2, LNG is stored in a tank. LNG flows out of the base of the tank along LNG supply line and is pressurized in a pump to about 70 bar (7 MPa). The pressurized LNG is discharges through a discharge line and enters a water bath vaporizer, which is maintained at a temperature of about 50° C. to about 90° C. by means of a burner that is fed by a pressurized fuel gas stream comprising a mixture of air provided through an air line and natural gas provided through an NG burner fuel line. The burner has an outlet tube that is submerged up to about 2 meters below the surface of the water in the water bath so that the combustion products must rise through and mix with the water thus heating the water. This arrangement leads to the condensation of much of the water produced by combustion of the natural gas, thus increasing the efficiency of the heating system. The cooled combustion gases are vented to the atmosphere along a vent line. The natural gas fuel is taken from the LNG tank boil-off line as a boil-off stream, which is compressed to the required burner pressure in an electrically driven boil-off blower. The air through the atmospheric air line required for combustion is purified through a filter, and is compressed to the burner pressure in the electrically driven burner pressure blower. The remaining LNG tank boil-off stream flows through a boil-off compressor line and is compressed to about 69 bar (6.9 MPa) in a boil-off compressor resulting in a compressed boil-off NG stream, which is mixed with the product natural gas steam exiting the vaporizer to produce the total natural gas pipeline flow stream at a pressure of about 69 bar (6.9 MPa) and a temperature of about 15° C. The quantity of natural gas consumed in the burner to convert the LNG to pipeline gas typically is about 1.55% of the total natural gas flow in the pipeline stream.

D. Shell & tube vaporizer (STV): STVs are used at small scale utilities and at several midscale LNG import terminals. STVs require and circulating intermediate loop to exchange the heat from warm seawater or warm cooling water with the intermediate circulating fluid on the shell side of the exchanger to heat the LNG on the tube side of the vaporizers.

E. Direct ambient air vaporizers (AAV): AAVs transfer heat from ambient air directly to the LNG flowing through fin tubes. AAVs are used extensively at industrial gas consumers to vaporize cryogenic liquid industrial oxygen, nitrogen and argon. They are used at small scale LNG facilities to vaporize small amounts of LNG. They are also applied in large scale applications at a few import terminals.

F. Various other minor vaporizers technologies have also been deployed onshore for vaporization.

In 2001, a revolutionary LNG concept was brought to the LNG marketplace. It was conceived a new way to deliver natural gas to remote markets. The idea was a Floating Storage and Regas Units (FSRU). FSRU are LNGCs or LNG barges that have with self-contained vaporization systems. The FSRU is equipped with high discharge pressure LNG pumps, STVs and boil-off-gas compressors to vaporize the LNG. The high-pressure gas from the vaporizer is transferred to shore by high pressure marine arms or a high pressure subsea gas pipeline. Most FSRUs utilize the heat of seawater to vaporize LNG. They typically use STV systems for vaporization. Warm seawater is either pumped directly to the shell side of the STVs or to heat exchangers in an intermediate circulating loop. Most intermediate fluids used are mixtures of ethylene glycol and water or propane. The warm seawater or the warm glycol water in the intermediate loop is used on the shell side of the STVs to vaporize the LNG on the tube side of the STV.

For non-limiting examples of FSRU's, please see the following non-exhaustive list of patents.

EP Patent Application No. 1809940, filed Nov. 8, 2004, with inventors Bowring et al, discloses an offshore liquefied natural gas floating storage regasification unit that may receive, store, and process liquefied natural gas from carriers. A floating storage regasification unit may include transfer equipment to offload liquefied natural gas from a carrier, a first mooring system to provide for mooring of a floating storage regasification unit at a location in a body of water, a second mooring system to provide for mooring a carrier to the floating storage regasification unit, and combinations thereof. A portion of the floating storage regasification unit may be composed of a double-hull containment structure.

U.S. Pat. No. 8,079,321, issued Dec. 20, 2011 to Balasubramanin, for a long tank FSRU/FLSV/LNGC, discloses a method and apparatus for storing liquid within a storage tank such that a natural resonance of fluid motion of the stored fluid falls between natural resonance periods of a floating vessel that includes the storage tank. As a result, resonant energy of the floating vessel imparted to fluid stored in the storage tank may be controlled and sloshing loads may be reduced, thereby avoiding damage to the floating vessel.

The time required to plan, permit, engineer, construct and commission a conventional onshore LNG import terminal is typically 5-10 years. The introduction of the FSRU allows this time to be reduced to less than 2 years. FSRU owners and operators who speculate, build and have the vessels in inventory can often reduce this construction time to less than 1 year (in some cases 6 months). The FSRU asset can be utilized for short term winter peaking or while a conventional LNG terminal is built and then relocated to other markets locations. Since the initial introduction, the market now includes new, purpose-built FSRUs. Further, older inefficient LNGCs have also been converted to new service as FSRUs.

The FSRU has revolutionized the industry. Ship owners and operators are purchasing new purpose built FSRUs for new markets and on speculation due to the high demand. There are currently over 340 million metric tons per annum (MTPA) of LNG production capacity with over 850 MTPA of additional capacity proposed (IGU World LNG Report—2017). Global vaporization (regas) capacity is 800 MTPA, however much of this capacity is overbuilt and underutilized in markets with excess gas or only need the excess capacity during peak demand periods. Currently over 80 MTPA of FSRU regas capacity is in active service representing 10% of the world regas capacity. There is currently an excess supply of LNG in the world market. Prices have dropped substantially, and the lower prices are attracting demand from many energy starved cities, countries and markets. Lower pricing has led to more open market opportunities for niche players to gain access to competitively priced LNG. At the same time the LNG carriers have become larger and more fuel efficient and can deliver LNG at lower day rates. This leaves many LNGC owners and operators with older, smaller, and less efficient 1st and 2nd generation LNG carriers that are not profitable. These ship owners and operators are seeking opportunities to redeploy these vessels in other profitable roles such as floating storage units (FSU) or converting them to FSRUs.

To utilize FSRUs in cold climates, environmentally sensitive areas or shallow water harbors where seawater cannot be utilized, the FSRUs must use process heat to supply warm circulating intermediate fluid to the vaporizers. Current FSRUs utilize some of the steam available from the ship propulsion steam generators supply the necessary heat to the intermediate fluid for vaporization. This heating method is inefficient and requires significant costly integration into the ship machinery spaces. Additional power, switchgear and switchboards are also required to supply the power for the LNG pumps and intermediate fluid circulating pumps.

There is currently a limited number of technology suppliers and shipyards around the world that supply new built FSRUs or convert LNGCs to FSRUs.

Water bath vaporizers are not believed to be useful for use in offshore facilities, floating facilities, and/or marine vessels. Such water bath vaporizers are never completely filled with water because expansion of the water with a temperature increase creates a rupture risk, so water bath vaporizers are never fully filled but rather filled in such a manner that there is always an air/vapor gap left in the top of the water bath vaporizer. Completely filling a water bath vaporizer with hot water does not eliminate this gap, as a temperature decrease causes thermal shrinkage and resulting in the forming of the air gap.

There will be a water surface formed at the interface of the water and the air gap. It is this water surface that will allow for formation of a wave should the water bath vaporizer be subjected to movement. The created wave can be dangerous and destructive.

There is a need in the art for an improved water bath vaporizer, for methods of making and using such a vaporizer, for methods of vaporizing liquids utilizing such a vaporizer, for systems utilizing/incorporating such vaporizer, to methods of modifying existing equipment by addition or substitution of such a vaporizer, and to modified equipment comprising such a vaporizer.

There is another need in the art for an improved water bath vaporizer that can be operated while subjected to motion, for methods of making and using such a vaporizer, for methods of making and using such a vaporizer, for methods of vaporizing liquids utilizing such a vaporizer, for systems utilizing/incorporating such vaporizer, to methods of modifying existing equipment by addition or substitution of such a vaporizer, and to modified equipment comprising such a vaporizer.

There is even another need in the art for an improved water bath vaporizer for vaporizing cryogenic fluids, for methods of making and using such a vaporizer, for methods of vaporizing liquids utilizing such a vaporizer, for systems utilizing/incorporating such vaporizer, to methods of modifying existing equipment by addition or substitution of such a vaporizer, and to modified equipment comprising such a vaporizer.

There is still another need in the art for an improved water bath vaporizer that can be utilized in offshore facilities, floating facilities, and/or marine vessels, for methods of making and using such a vaporizer, for methods of vaporizing liquids utilizing such a vaporizer, for offshore facilities, floating facilities, and/or marine vessels that utilize/incorporate such vaporizer, to methods of modifying existing offshore facilities, floating facilities, and/or marine vessels by addition or substitution of such a vaporizer, and to modified offshore facilities, floating facilities, and/or marine vessels comprising such a vaporizer.

There is yet another need in the art for an improved water bath vaporizer for vaporizing cryogenic fluids on offshore facilities, floating facilities, and/or marine vessels, for methods of making and using such a vaporizer, for offshore facilities, floating facilities, and/or marine vessels that utilize/incorporate such vaporizer, to methods of modifying existing equipment by addition or substitution of such a vaporizer, and to modified offshore facilities, floating facilities, and/or marine vessels comprising such a vaporizer.

There is even still yet another need in the art for an improved water bath vaporizer for vaporizing LNG on offshore facilities, floating facilities, and/or marine vessels, for methods of making and using such a vaporizer, for offshore facilities, floating facilities, and/or marine vessels that utilize/incorporate such vaporizer, to methods of modifying existing equipment by addition or substitution of such a vaporizer, and to modified offshore facilities, floating facilities, and/or marine vessels comprising such a vaporizer.

These and other needs in the art will become apparent upon the review of this written specification, claims and/or drawings.

SUMMARY OF THE INVENTION

It is an object of the present invention, to provide for an improved water bath vaporizer, for methods of making and using such a vaporizer, for methods of vaporizing liquids utilizing such a vaporizer, for systems utilizing/incorporating such vaporizer, to methods of modifying existing equipment by addition or substitution of such a vaporizer, and to modified equipment comprising such a vaporizer.

It is another object of the present invention, to provide for an improved water bath vaporizer that can be operated while subjected to motion, for methods of making and using such a vaporizer, for methods of making and using such a vaporizer, for methods of vaporizing liquids utilizing such a vaporizer, for systems utilizing/incorporating such vaporizer, to methods of modifying existing equipment by addition or substitution of such a vaporizer, and to modified equipment comprising such a vaporizer.

It is even another object of the present invention, to provide for an improved water bath vaporizer for vaporizing cryogenic fluids, for methods of making and using such a vaporizer, for methods of vaporizing liquids utilizing such a vaporizer, for systems utilizing/incorporating such vaporizer, to methods of modifying existing equipment by addition or substitution of such a vaporizer, and to modified equipment comprising such a vaporizer.

It is yet another object of the present invention, to provide for an improved water bath vaporizer that can be utilized in offshore facilities, floating facilities, and/or marine vessels, for methods of making and using such a vaporizer, for methods of vaporizing liquids utilizing such a vaporizer, for offshore facilities, floating facilities, and/or marine vessels that utilize/incorporate such vaporizer, to methods of modifying existing offshore facilities, floating facilities, and/or marine vessels by addition or substitution of such a vaporizer, and to modified offshore facilities, floating facilities, and/or marine vessels comprising such a vaporizer.

It is still another object of the present invention, to provide for vaporizing cryogenic fluids on offshore facilities, floating facilities, and/or marine vessels, for methods of making and using such a vaporizer, for offshore facilities, floating facilities, and/or marine vessels that utilize/incorporate such vaporizer, to methods of modifying existing equipment by addition or substitution of such a vaporizer, and to modified offshore facilities, floating facilities, and/or marine vessels comprising such a vaporizer.

It is yet another object of the present invention, to provide for an improved water bath vaporizer for vaporizing LNG on offshore facilities, floating facilities, and/or marine vessels, for methods of making and using such a vaporizer, for offshore facilities, floating facilities, and/or marine vessels that utilize/incorporate such vaporizer, to methods of modifying existing equipment by addition or substitution of such a vaporizer, and to modified offshore facilities, floating facilities, and/or marine vessels comprising such a vaporizer.

These and other objects of the present invention will become apparent upon the review of this written specification, claims and/or drawings.

According to one non-limiting embodiment of the present invention, there is provided a marinized water bath vaporizer. This vaporizer may include a water vaporizer chamber having a water vaporizer chamber horizontal cross-sectional area. This vaporizer may also include a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area. The vaporizer may also include a water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inface being substantially equal to the water vapor chamber horizontal cross-sectional area. The vaporizer may also include a heating system providing heat to the water bath. This vaporizer may also include a vaporizer heat exchange loop immersed in said water vaporizer chamber and immersed in said water bath, said loop having an inlet end and an outlet end; an inlet pipe extending from outside the vaporizer chamber to connect with the inlet end of said heat transfer loop to carry a fluid to be heated into said loop; and, an outlet pipe extending from said outlet ends to the outside of the vaporizer chamber to carry said fluid away from said loop after it has been heated.

According to another non-limiting embodiment of the present invention, there is provided a method of vaporizing a liquid, in a water vaporizer chamber having a water vaporizer chamber horizontal cross-sectional area with a sloshing chamber in liquid communication with and positioned on top of the water vaporizer chamber, wherein the sloshing chamber has a sloshing horizontal cross-sectional area that is substantially less than the water vaporizer horizontal cross-sectional area, wherein a water bath fills said water vaporizer chamber and said sloshing chamber such that the water vaporizer chamber is substantially full of water with the sloshing chamber partially filled with water with a horizontal water level created in the sloshing chamber, with a vaporizer heat exchange loop immersed in said water vaporizer chamber and surrounded by said water bath. The method may include circulating the liquid through the vaporizer heat exchange loop to vaporize the liquid.

According to another non-limiting embodiment of the present invention, there is provided a method of vaporizing multiple liquids, in a water vaporizer chamber having a water vaporizer chamber horizontal cross-sectional area with a sloshing chamber in liquid communication with and positioned on top of the water vaporizer chamber, wherein the sloshing chamber has a sloshing horizontal cross-sectional area that is substantially less than the water vaporizer horizontal cross-sectional area, wherein a water bath fills said water vaporizer chamber and said sloshing chamber such that the water vaporizer chamber is substantially full of water with the sloshing chamber partially filled with water with a horizontal water level created in the sloshing chamber, with multiple vaporizer heat exchange loops immersed in said water vaporizer chamber and surrounded by said water bath. The method may include circulating each of the multiple liquids though at least one of the multiple vaporizer heat exchange loops to vaporize the liquid.

According to another non-limiting embodiment of the present invention, there is provided a floating marinized water bath vaporizer. The vaporizer may include a floating substrate floating in a body of water. The vaporizer may include a water vaporizer chamber supported by the substrate and having a water vaporizer chamber horizontal cross-sectional area. The vaporizer may include a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area. The vaporizer may include water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inface being substantially equal to the water vapor chamber horizontal cross-sectional area. The vaporizer may include a heating system providing heat to the water bath. The vaporizer may include a vaporizer heat exchange loop immersed in said water vaporizer chamber and immersed in said water bath, said loop having an inlet end and an outlet end; an inlet pipe extending from outside the vaporizer chamber to connect with the inlet end of said heat transfer loop to carry a fluid to be heated into said loop; and, an outlet pipe extending from said outlet ends to the outside of the vaporizer chamber to carry said fluid away from said loop after it has been heated.

According to another non-limiting embodiment of the present invention, there is provided a travelling floating marinized water bath vaporizer, similar to the embodiment above, except the substrate is a travelling floating substrate travelling on a body of water.

According to another non-limiting embodiment of the present invention, there is provided an anchored floating marinized water bath vaporize, similar to the two embodiments immediately above, except that the substrate is an anchored floating substrate anchored in a body of water.

According to another non-limiting embodiment of the present invention, there is provided a method of vaporizing a liquid, in a water vaporizer chamber supported by a floating substrate floating in a body of water, the water vaporizing chamber having a water vaporizer chamber horizontal cross-sectional area with a sloshing chamber in liquid communication with and positioned on top of the water vaporizer chamber, wherein the sloshing chamber has a sloshing horizontal cross-sectional area that is substantially less than the water vaporizer horizontal cross-sectional area, wherein a water bath fills said water vaporizer chamber and said sloshing chamber such that the water vaporizer chamber is substantially full of water with the sloshing chamber partially filled with water with a horizontal water level created in the sloshing chamber, with a vaporizer heat exchange loop positioned in said water vaporizer chamber and surrounded by said water bath. The method may include circulating the liquid through the vaporizer heat exchange loop to vaporize the liquid.

According to another non-limiting embodiment of the present invention, there is provided a method of vaporizing multiple liquids, in a water vaporizer chamber supported by a floating substrate floating in a body of water, the water vaporizing chamber having a water vaporizer chamber horizontal cross-sectional area with a sloshing chamber in liquid communication with and positioned on top of the water vaporizer chamber, wherein the sloshing chamber has a sloshing horizontal cross-sectional area that is substantially less than the water vaporizer horizontal cross-sectional area, wherein a water bath fills said water vaporizer chamber and said sloshing chamber such that the water vaporizer chamber is substantially full of water with the sloshing chamber partially filled with water with a horizontal water level created in the sloshing chamber, with multiple vaporizer heat exchange loops immersed in said water vaporizer chamber and surrounded by said water bath. The method may include circulating each of the multiple liquids though at least one of the multiple vaporizer heat exchange loops to vaporize the liquid.

According to another non-limiting embodiment of the present invention, there is provided a marinized water bath vaporizer system. The system may include a water vaporizer chamber having a water vaporizer chamber horizontal cross-sectional area. The system may also include a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area; and/or a water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inter face being substantially equal to the water vapor chamber horizontal cross-sectional area; and/or a heating system providing heat to the water bath. The system may also include a vaporizer heat exchange loop immersed in said water vaporizer chamber and surrounded by said water bath. The system may also include a boil off gas heat exchange loop immersed in said water vaporizer chamber and surrounded by said water bath. The system may also include a surge tank for receiving a fluid to be vaporized, with the fluid to be vaporized separating inside the surge tank into a surge tank liquid phase and a surge tank boil off gas phase; a fluid travel path defined from the surge tank liquid phase to and through the vaporizer heat exchange loop; and, a boil off gas travel path defined from the surge tank boil off gas phase to and through the boil off gas heat exchange loop and then to the heating system where the boil off gas is consumed as fuel.

According to another non-limiting embodiment of the present invention, there is provided a floating marinized water bath vaporizer system that is similar to the embodiment above, except that the substrate is a floating substrate floating in a body of water.

According to another non-limiting embodiment of the present invention, there is provided a travelling floating marinized water bath vaporizer system that is similar to the two embodiments immediately above, except that the substrate is a travelling floating substrate travelling on a body of water.

According to another non-limiting embodiment of the present invention, there is provided an anchored floating marinized water bath vaporizer system that is similar to the three system embodiments immediately above, except that the substrate is an anchored floating substrate anchored in a body of water.

According to another non-limiting embodiment of the present invention, there is provided an LNG carrier. This LNG carrier may include an LNG storage tank. This LNG carrier may include a water bath vaporizer system that includes: i. a water vaporizer chamber having a water vaporizer chamber horizontal cross-sectional area; ii. a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area; iii. water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inface being substantially equal to the water vapor chamber horizontal cross-sectional area; iv. heating system providing heat to the water bath; v. a vaporizer heat exchange loop immersed in said water vaporizer chamber and immersed in said water bath, said loop having an inlet end and an outlet end; vi. an inlet pipe extending from outside the vaporizer chamber to connect with the inlet end of said heat transfer loop to carry a fluid to be heated into said loop; and/or vii. an outlet pipe extending from said outlet ends to the outside of the vaporizer chamber to carry said fluid away from said loop after it has been heated. The system may also include a liquid travel path defined from the LNG storage tank to the inlet pipe.

According to another non-limiting embodiment of the present invention, there is provided an LNG carrier that is very similar to the above embodiment except, the LNG storage tank contains LNG, with a first pump having a suction immersed in the LNG, and the is an LNG liquid travel path defined from the first pump to the inlet pipe.

According to another non-limiting embodiment of the present invention, there is provided an LNG carrier that is very similar to the above embodiment except, the LNG storage tank contains LNG, with a first pump having a suction immersed in the LNG and creating an LNG discharge stream; there is a surge tank containing LNG received from the first pump LNG discharge stream; and there is a second pump, in liquid communication with the LNG in the surge tank, with an LNG liquid travel path from the surge tank, to the second pump to the inlet pipe.

These and other embodiments of the present invention will become apparent upon the review of this written specification, claims and/or drawings.

BRIEF DESCRIPTION OF THE FIGURES

The following drawings illustrate some of the many possible non-limiting embodiments of this disclosure in order to provide a basic understanding of this disclosure. These drawings do not provide an extensive overview of all embodiments of this disclosure. These drawings are not intended to identify key or critical elements of the disclosure or to delineate or otherwise limit the scope of the claims. The following drawings merely present some non-limiting concepts of the disclosure in a general form. Thus, for a detailed understanding of this disclosure, reference should be made to the following detailed description, taken in conjunction with the accompanying drawings, in which like elements have been given like numerals.

DETAILED DESCRIPTION OF THE INVENTION

The present invention relates to LNG, and to methods and apparatus for processing LNG. While the present invention does relate to various offshore applications, it also may have onshore applications. More specifically, regarding offshore applications, the present invention relates to, but is not limited to floating storage and regas vessels, to methods of making and using same, and to LNG produced thereby.

Figure 1:
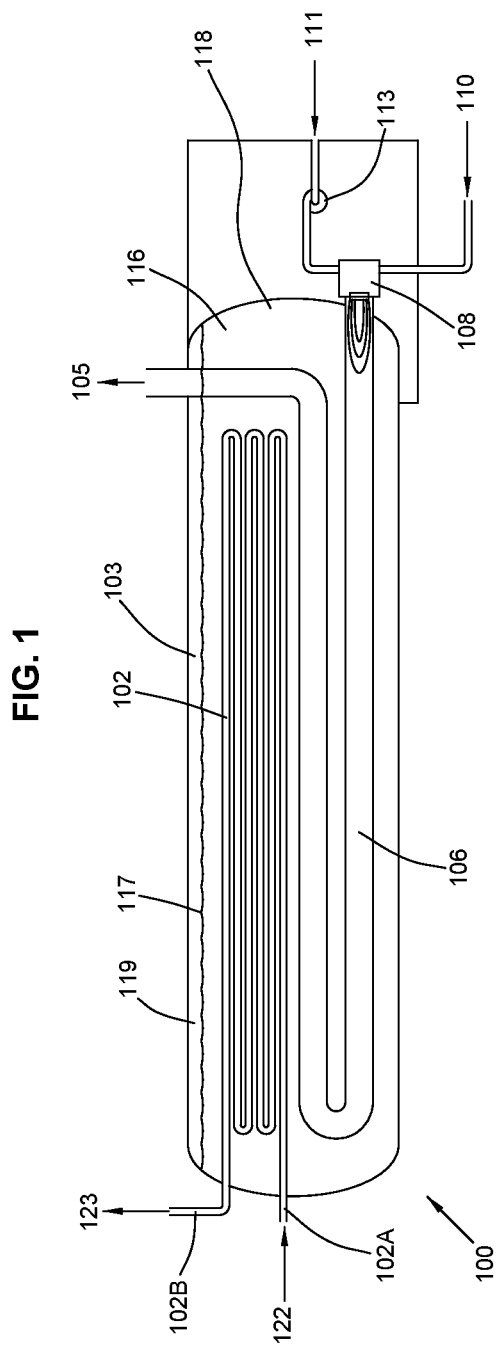
FIG. 1 is a schematic representation of a prior art conventional water bath vaporizer 100, showing vaporization coil bundle 102 residing in water bath 116, heated by firetube 106 through which flows hot exhaust gas 105 from burner 108.

Referring first to FIG. 1, there is shown an example of prior art conventional water bath vaporizer 100. As shown in FIG. 1, LNG stream 122 enters vaporization coil bundle 102 at input end 102A with vaporized natural gas stream 123 exiting vaporization coil bundle 102 at discharge end 102B. Vaporization coil bundle resides in water bath 116 below water level 117. Water 118 in water bath 116 is heated by firetube 106 through which flows hot exhaust gas 105 from burner 108. As shown in FIG. 1, conventional air blower 113 provides air 111 to burner 108, with fuel gas 110 also being provided to burner 108. Heated water bath 116 provides heat to vaporization coil 102. Certainly, water 118 may also include an anti-freezing agent as are commonly known in the art, including but not limited to ethylene glycol and propylene glycol.

At water level 117, water bath vaporizer 100 will have a given horizontal cross-sectional area. At this water level 117, water 118 forms a water surface 119 at the interface between water 118 and vapor phase 103, with this water surface 119 having a water surface area substantially equal to the water bath cross-sectional area (at fill level 117). The problem with prior art conventional water bath vaporizer 100 is that use of it on a mobile or floating marine vessel would be problematic as water 118 in water bath 116 would shift or flow back and forth with the movement of the marine vessel creating one or more waves on water surface 119. Depending on the severity of the created wave, it could range from being annoying or distracting, to dangerous, to destructive. Without being limited by theory, the inventors believe that the larger the cross-sectional area of water surface 119 and/or the larger the air gap, the more potentially destructive the resulting wave.

Figure 2:
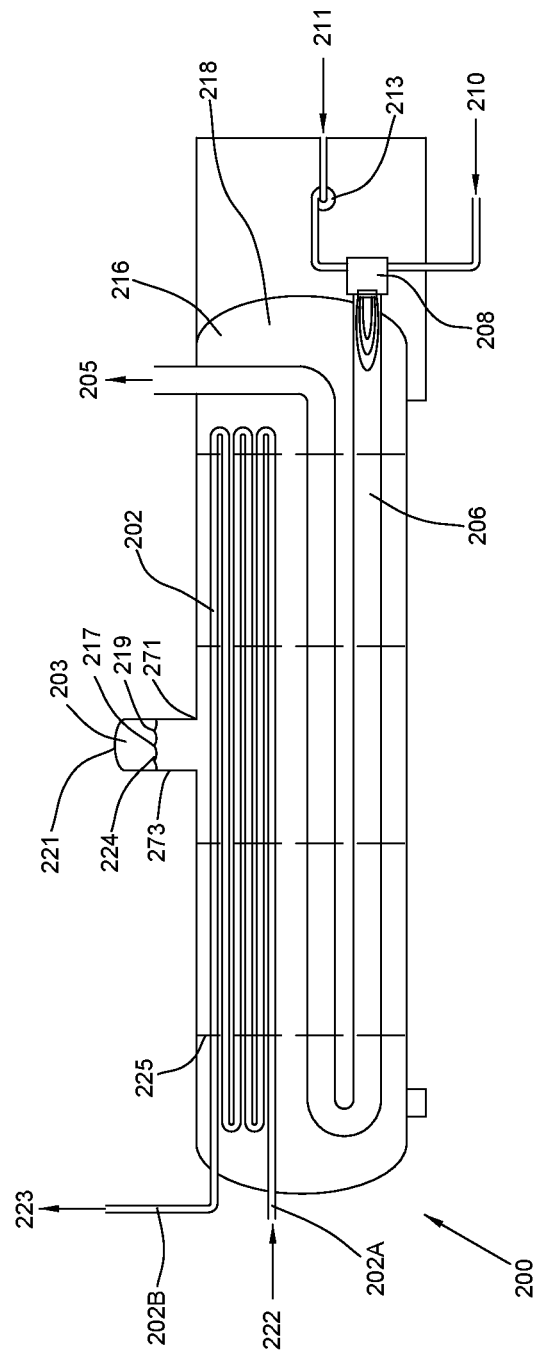
FIGS. 2 and 3 are schematic representations of non-limiting embodiments of marinized water bath vaporizers 200 and 250 of the present invention. The distinction between the two resides in the configuration of slosh attenuation drum 221.
Figure 3:
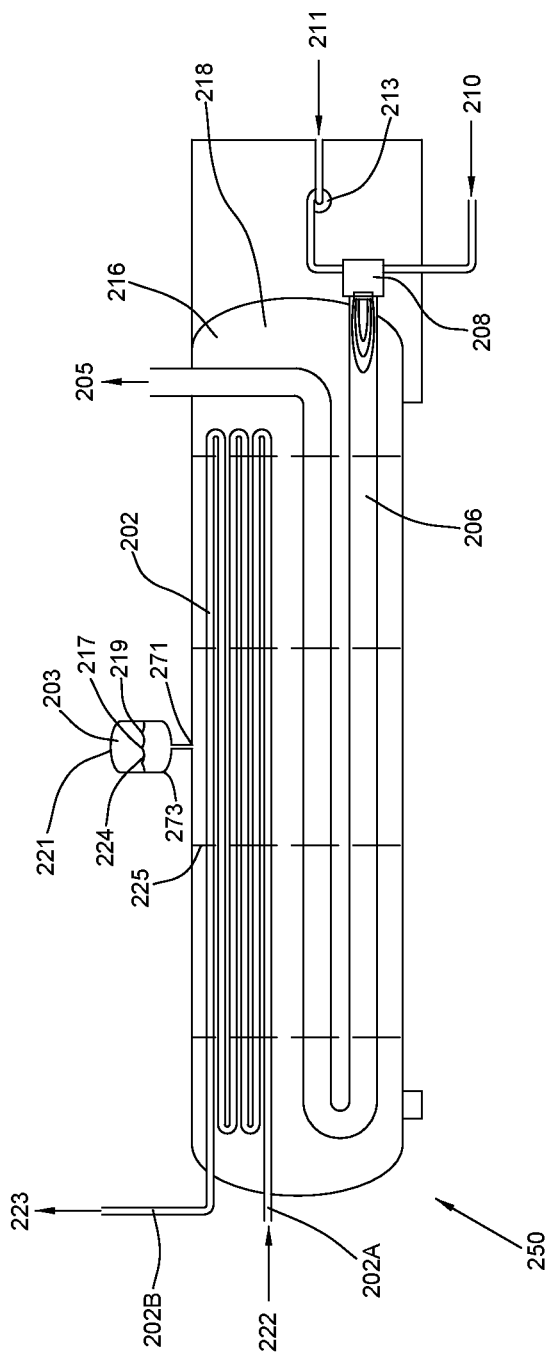

Referring now to FIGS. 2 and 3, there are shown non-limiting examples of a marinized water bath vaporizers 200 and 250 of the present invention. The distinction between the two resides in the configuration of slosh attenuation drum 221. Many of the features of this marinized water bath vaporizers 200 and 250 are the same or similar to those of the conventional water bath vaporizer of FIG. 1. Specifically, as shown in FIG. 2, LNG stream 222 enters vaporization coil bundle 202 at input end 202A with vaporized natural gas stream 223 exiting vaporization coil bundle 202 at discharge end 202B. Vaporization coil bundle 202 resides in water bath 216 below water level 217. Water 218 in water bath 216 is heated by firetube 206 through which flows hot exhaust gas 205 from burner 208. As shown in FIG. 3, conventional air blower 213 provides air stream 211 to burner 208, with fuel gas stream 210 also being provided to burner 208. Heated water bath 216 provides heat to vaporization coil 202. At least one patentable feature over the prior art, includes sloshing attenuation drum 221, reduced sloshing surface 223, and/or slosh attenuation baffles 225.

It should be understood that heating of water bath 216 may also be accomplished by other methods, including steam systems and electrical heating systems.

At water level 217, slosh attenuation drum 221 will have a horizontal cross-sectional area. At this water level 217, water 218 forms a water surface 219 at the interface between water 218 and vapor phase 203, with this water surface 219 having a water surface area substantially equal to the slosh attenuation drum horizontal cross-sectional area (at fill level 217). Water level 217 extends up and into sloshing attenuation drum 221, and provides a reduced sloshing surface 217. Thus, reduced sloshing surface 217 limits the extent and/or size or any wave that might be generated because of movement of the marinized water bath vaporizers 200 or 250.

The general idea of the present invention is to utilize a slosh attenuation drum 221 that will have a horizontal cross-sectional area at the given fill line that produces a water surface 219 that is suitably small to reduce the size of any wave created in slosh attenuation drum 221.

Water bath 216 has a generally constant horizontal cross-sectional area with respect to height, although because of the slight curvature of the ends, appears to provide the largest horizontal cross-sectional area at about ½ the height of water bath 216, that is, for a fill line about ½ the way up the sides. Generally, when compared to the largest horizontal water surface area that would be produced in water bath 216, the area of water surface 219 produced in slosh attenuation drum 221 should be at least 0.1%, 0.25%, 0.50%, 075%, 1%, 2%, 2.5%, 3%, 4%, or 5% of the largest cross-sectional area of water bath 216. Generally, when compared to the largest horizontal water surface area that would be produced in water bath 216, the area of water surface 219 produced in slosh attenuation drum 221 could be at any of the following, less than any of the following, or in a range from/to, any two of two of the following: 0.1%, 0.25%, 0.50%, 075%, 1%, 2%, 2.5%, 3%, 4%, 5%, 6%, 7%, 8%, 9%, 10%, 15%, 20%, 30%, 40% 50%, 60%, 70%, or 80% of the largest cross-sectional area of water bath 216. As non-limiting examples, 1%, 3%, 5%, 10%, 20% or 40%. As further non-limiting examples, less than 1%, less than 5%, less than 10%, or less than 50%. Non-limiting examples of ranges include from 1% to 20%, from 1% to 40%, from 3% to 10%, from 3% to 50%, from 5% to 70%.

Pitching of water bath vaporizer 200 will cause water level 217 to move relative to the sides of slosh attenuation drum 221. For example, looking at FIG. 2, if the left side of water bath vaporizer 200 pitched upward, and the right side downward, the left side of water level 217 would move downward toward bottom 273, and the right side of water level 217 would move upward. It is generally preferred that water level 217 not move below bottom 273. Thus, water level 217 will generally be a sufficient height 273 above slosh attenuation drum bottom 271, such that water level 217 will not go below bottom 273 during operations. Of course, this height 273 could be engineered for "normal" operating conditions, for "rough" operating conditions, or even for "extreme" operating conditions.

Further, the inventive method and apparatus described herein provide a separate, unique, low cost and fast way to convert any LNGC to a FSRU. The method and apparatus may eliminate one or more of the seawater system, intermediate fluid circulation system, integration of the intermediate fluid heating system with the ship steam system and retrofitting of the ship electrical switchgear or switchboards. The present invention may utilize any number of vaporizers, including water bath vaporizers, submerged combustable vaporizers, open rack vaporizers, shell & tube vaporizers, ambient air vaporizers, direct electric vaporizers, steam vaporizers and water pot vaporizers. As a non-limiting example, the method and apparatus may utilize an adaptation (marinization) of WBVs vaporizers (or marinization of any vaporizer for that matter) for use on a LNGC/FSRU. WBVs are well known for onshore use where the bath vessel is stationary and not subjected to floating vessel motions and accelerations. A conventional onshore style water bath vaporizer is not suitable for shipboard operations due to sloshing of the water surface within in the water bath vessel that can expose the vaporization tube bundles to sloshing wave forces (slamming) and temporarily exposing the vaporization coils to unsubmerged and freezing conditions. Currently, it is not practical to use a WBV offshore, because the WBV must be significantly modified to be suitable for the accelerations and ship motions subjected to the system from the floating environment. The water bath vaporizer is marinized with several inventive modifications for ship use. This may include the complete filling of the water bath tank and the addition of a small slosh attenuation drum connected or mounted above the tank to eliminate the large free surface of water in the tank. This modification significantly reduces the sloshing/slamming forces and keeps all of the coils continuously submerged. Internal baffles may also be added in the bath to further mitigate sloshing. Modifications to the conventional WBV may also include marinization of the burner and combustion air systems to ship type burners and controls with adequate safeguards suitable for certification by classification agencies. The module support structure and water bath shell and saddle supports may also be strengthened and designed for the high accelerations and ship motions for the floating environment. The entire regas system may be fabricated into structural modules, placed on the bow (or other suitable location on the LNGC) and structurally supported above the deck, allowing free access to winches, blocks, tackle, lines, fairleads and other required ship systems.

For one non-limiting embodiment, the vaporizing system may include the following items:

1. Marinized water bath vaporizer that includes one or more of the modifications as described above;

2. A high-pressure LNG pump system to raise the pressure of the LNG to the desired vaporization pressure;

a. For a new build FSRUs and extensive conversion of existing LNGCs, the HP pump may be installed in the ship LNG containment tanks with dedicated high-pressure piping to the vaporization module.

b. For simple conversion of an existing LNGC to an FSRU or a shuttle regas vessel (SRV), a simple, low pressure, LNG pump drum is connected to the existing LNGC liquid and vapor manifold piping and kept full by the existing vessel cargo pumps. The high pressure pumps may be external vessel mounted pumps fed by the tank or be submerged inside the LNGC containment tanks.

3. A liquid phase recondenser for condensing a portion or all of the boil-off-gas (BOG) generated by heat leaking into the LNG from the environment and from LNG pump inefficiencies;

4. Fuel gas for the WBV burners and dedicated gensets will be supplied from the LNGC/FSRU forcing fuel gas vaporizers, or from the LNGC's High Duty (HD) or Low Duty (LD) BOG compressors or by a LP vaporizing pass in the WBV;

5. Power supplied from the LNGC/FSRU or from a dedicated genset package on the regas modules;

6. Natural gas metering package for measuring and custody transfer for the vaporized gas; and/or, 7. Discharge manifold for access to shoreside high pressure marine arms.

Certainly, the present invention contemplates that the vaporizing unit as described herein may be manufactured "new" or may be obtained by modifying an old vaporizing unit. Thus, an inventive method of the present invention includes the modification of an old vaporizing unit to obtain the inventive vaporizing unit as described herein.

In some embodiments, submerged combustion vaporizers may be more efficient than the waterbath vaporizers, but in some circumstances might present problems with bath chemistry. Another non-limiting embodiment would be to pump water from the waterbath to a waste heat recovery unit on the gas turbine to reduce the fuel requirement for the burners on the waterbath vaporizer. This allows significant heat to be added to the water bath with burning the fuel. This improves the efficiency of the waterbath vaporizer to be much better than a submerged combustion vaporizer with all the same benefits. This radically cuts the energy consumption and the carbon footprint. This (and other embodiments) are not just limited to offshore and FSRU applications, but may also be useful in onshore applications too.

Figure 4:
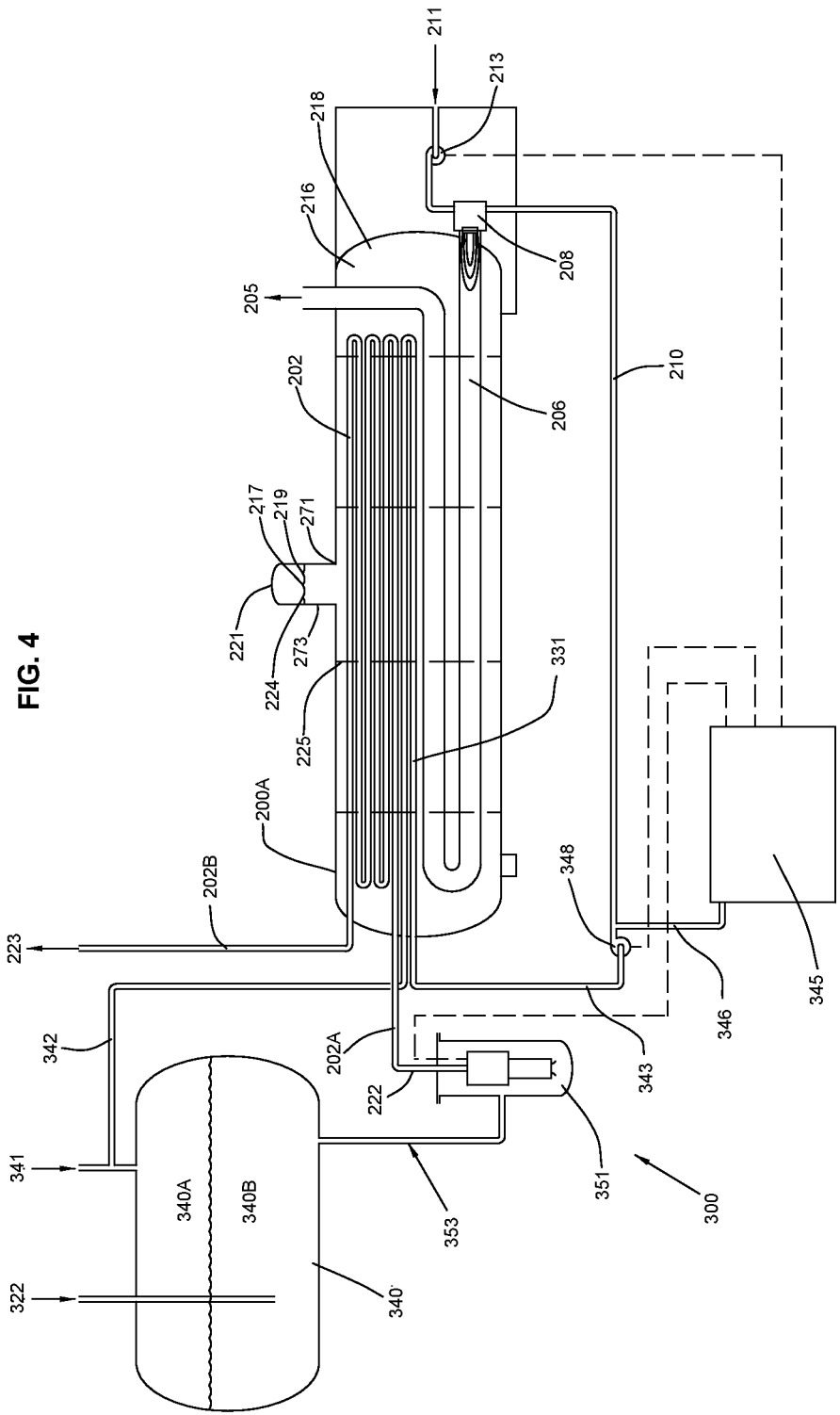
FIG. 4 is a schematic representation of marinized vaporization system 300 which includes (among other things) marinized water bath vaporizer 200A. This marinized water bath vaporizer 200A includes many features that are the same or similar to those of the conventional water bath vaporizer of FIG. 1 and/or to those of marinized water bath vaporizer 200 in FIGS. 2 and 3. This marinized water bath vaporizer 200A further includes a fuel gas coil bundle 331 though water bath 216 for heating cold BOG fuel gas stream 342.

Referring additionally to FIG. 4, there is shown a non-limiting embodiment of marinized vaporization system 300 which includes (among other things) marinized water bath vaporizer 200A. This marinized water bath vaporizer 200A includes many features that are the same or similar to those of the conventional water bath vaporizer of FIG. 1 and/or to those of marinized water bath vaporizer 200 in FIGS. 2 and 3. This marinized water bath vaporizer 200A further includes a fuel gas coil bundle 331 though water bath 216 for heating cold bog fuel gas stream 342. Specifically, as shown in FIG. 4, LNG stream 222 enters vaporization coil bundle 202 at input end 202A with vaporized natural gas stream 223 exiting vaporization coil bundle 202 at discharge end 202B. Vaporization coil bundle 202 resides in water bath 216 below water level 217. Water 218 in water bath 216 is heated by firetube 206 through which flows hot exhaust gas from burner 208. As shown in FIG. 4, conventional air blower 213 provides air stream 211 to burner 208, with warm LP fuel gas stream 210 also being provided to burner 208. Heated water bath 216 provides heat to vaporization coil 202 and fuel gas bundle 331. At least one patentable feature over the prior art, includes sloshing attenuation drum 222 and/or slosh attenuation baffles 225. Water level 217 extends up and into sloshing attenuation drum 221, and provides a reduced sloshing surface 217. Thus, reduced sloshing surface 217 limits the extent and/or size or any wave that might be generated because of movement of the marinized water bath vaporizer 200A.

LNG stream 322 and bog vapor stream 341 are both directed into LNG surge drum 340 which has a vapor portion 340A and a liquid portion 340B. LNG stream 353 is provided to high pressure LNG pump 351, which provides LNG stream 222 to vaporization coil bundle 202 at input end 202A with vaporized natural gas steam 223 exiting vaporization coil bundle 202 at discharge end 202B.

Usually, BOG is a nuisance, and requires utilization of a BOG compressor, a recondenser, and/or a re-liquifier. The present invention overcomes the general problem with BOG and easily utilizes it as a fuel source. Cold BOG fuel gas stream 342 is directed though fuel gas coil bundle 302, from which it exits as a heated fuel gas stream 343 to be compressed by fuel gas compressor 348. This compressor 348 provides warm LP fuel gas stream 310 to burner 208, and also provides warm LP fuel gas stream 346 to gas fueled generator set 345.

Gas fueled generator 345 may be configured to provide electrical power to high pressure LNG pump 351, fuel gas compressor 348, and/or combustion air blower 211.

Figure 8:
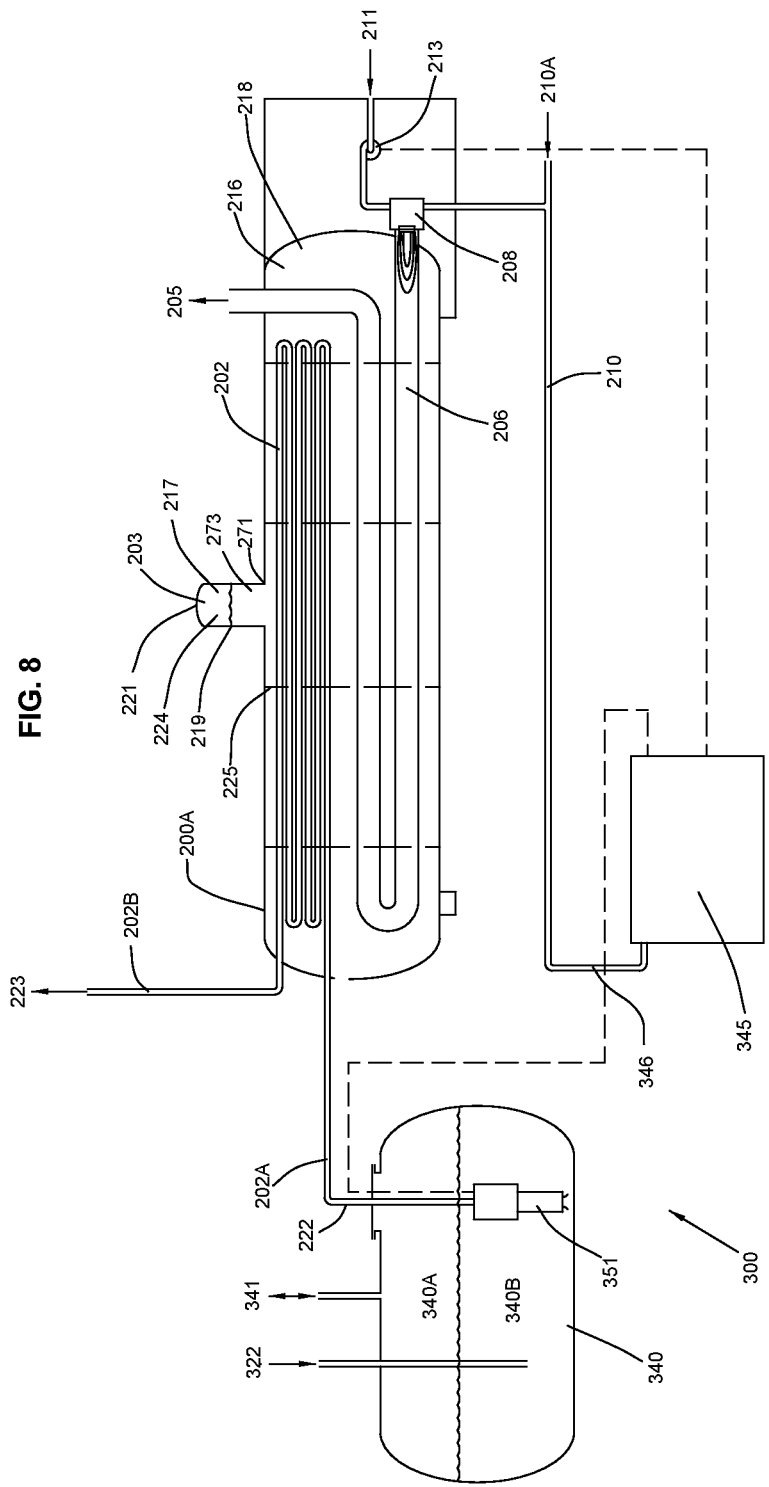
FIG. 8 is a schematic representation of marinized vaporization system 300 of FIG. 4 having an alternative fuel gas source 210A, that may be used in combination with fuel gas stream 210 or as an alternative to fuel gas stream 210.

Referring additionally to FIG. 8, there is shown a modification of marinized vaporization system 300 of FIG. 4 having an alternative fuel gas source 210A, that may be used in combination with fuel gas stream 210 or as an alternative to fuel gas stream 210.

Figure 9:
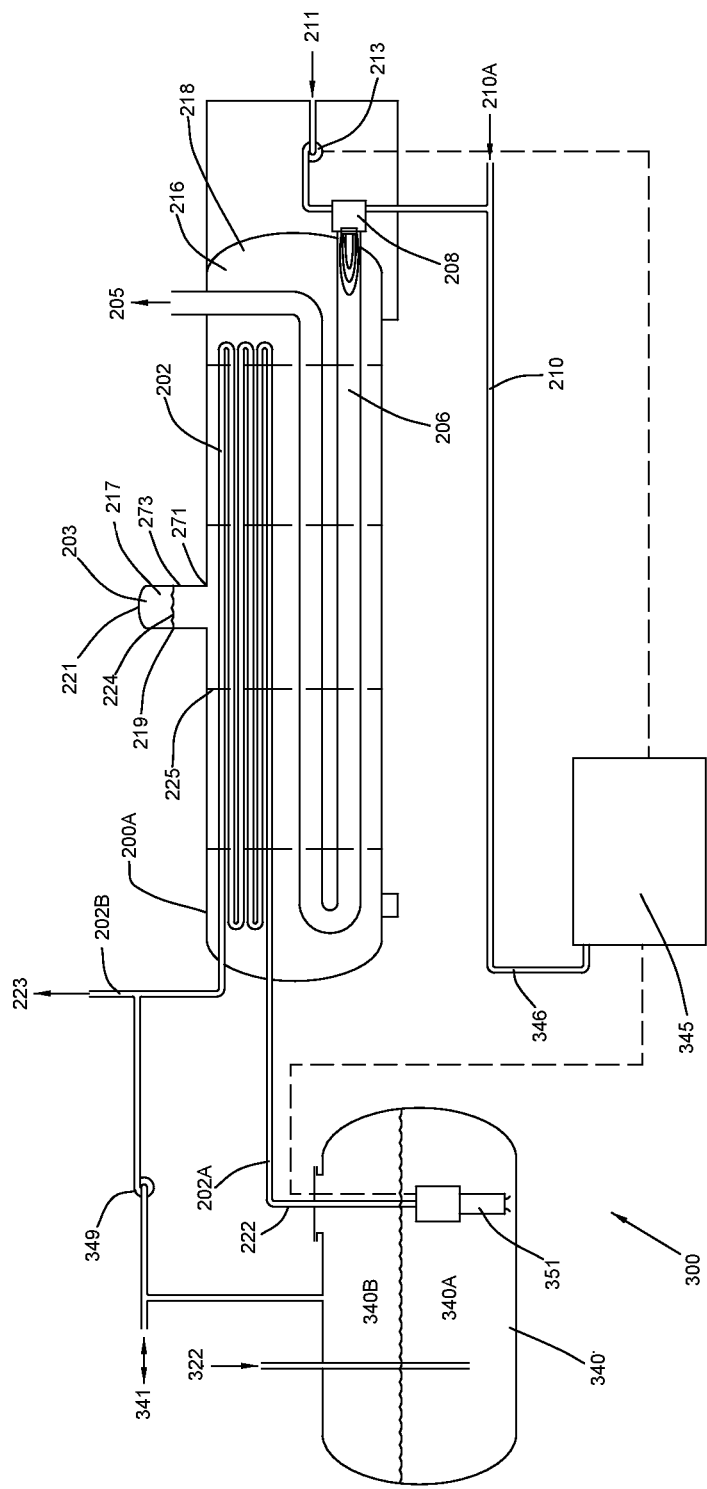
FIG. 9 is a schematic representation of marinized vaporization system 300 of FIG. 4 having an alternative fuel gas source 210A, that may be used in combination with fuel gas stream 210 or as an alternative to fuel gas stream 210, and having BOG compressor 349 for handling BOG vapor.

Referring additionally to FIG. 9, there is shown a modification of marinized vaporization system 300 of FIG. 4 having an alternative fuel gas source 210A, that may be used in combination with fuel gas stream 210 or as an alternative to fuel gas stream 210, and having BOG compressor 349 for handling BOG vapor.

Figure 5:
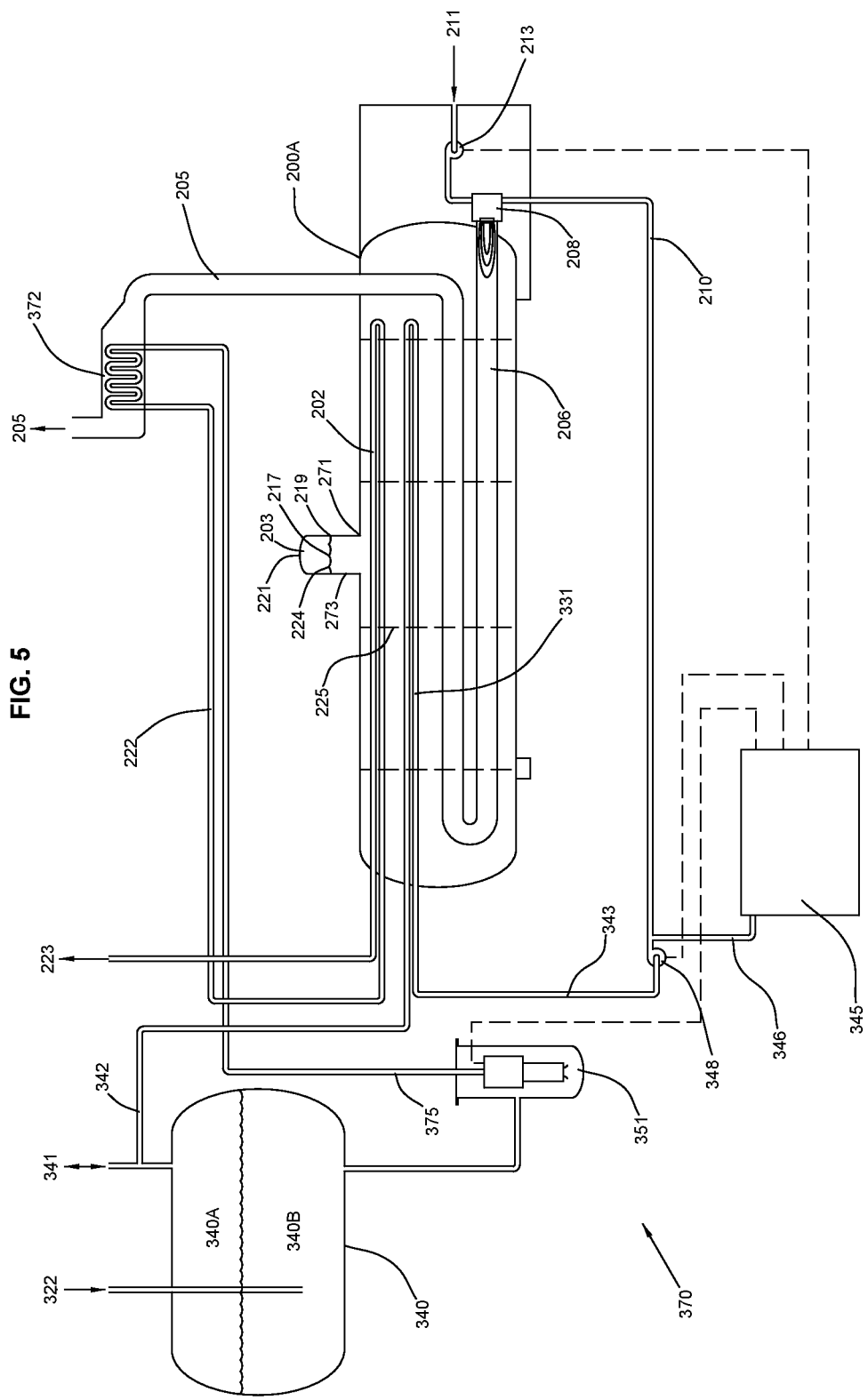
FIG. 5 is a schematic representation of marinized vaporization system 370 that includes many features that are the same or similar to the conventional water bath vaporizer of FIG. 1, to those of marinized water bath vaporizer 200 in FIGS. 2 and 3, and/or to those of the marinized vaporization system 300 of FIG. 4. This marinized vaporization system includes a waste heat recovery unit 372 to recover heat from combustion exhaust gas 205 to preheat LNG 375.

Referring additionally to FIG. 5, there is shown a non-limiting embodiment of marinized vaporization system 370 that includes many features that are the same or similar to the conventional water bath vaporizer of FIG. 1, to those of marinized water bath vaporizer 200 in FIGS. 2 and 3, and/or to those of the marinized vaporization system 300 of FIG. 4. This marinized vaporization system includes a waste heat recovery unit 372 to recover heat from combustion exhaust gas 205 to preheat LNG 375.

Figure 6:
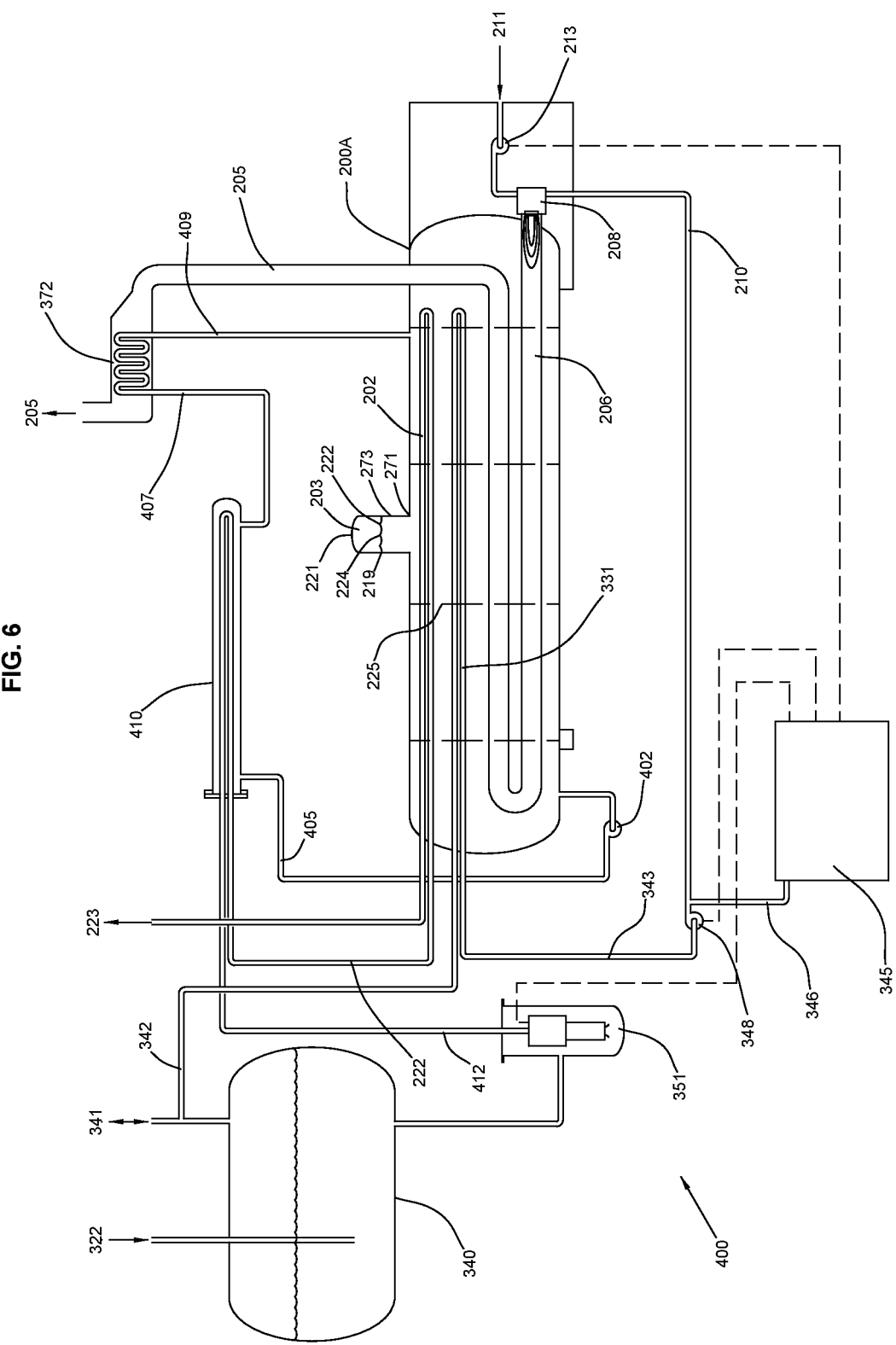
FIG. 6 is a schematic representation of marinized vaporization system 400 that includes many features that are the same or similar to those of the marinized vaporization system 300 of FIG. 4 and/or marinized vaporization system 370 of FIG. 5. Like the marinized vaporization system 370 of FIG. 4, marinized vaporization system 400 includes a waste heat recovery unit 372 to recover heat from combustion exhaust gas 205, however, it is configured to re-heat cold water 407. Marinized vaporization system 400 further includes an economizer exchanger 410 that is configured to pre-heat LNG 412.

Referring additionally to FIG. 6, there is shown a non-limiting embodiment of marinized vaporization system 400 that includes many features that are the same or similar to those of the marinized vaporization system 300 of FIG. 4 and/or marinized vaporization system 370 of FIG. 5. Like the marinized vaporization system 370 of FIG. 4, marinized vaporization system 400 includes a waste heat recovery unit 372 to recover heat from combustion exhaust gas 205, however, it is configured to re-heat cold water 407. Marinized vaporization system 400 further includes an economizer exchanger 410 that is configured to pre-heat LNG 412. Hot water pump 402 provides hot water stream 405 from water bath vaporizer 200A to economizer exchanger 410. Cold water stream 407 from economizer exchanger 410 is then routed to water heat recovery unit 372, exiting as hot water stream 409 which is routed back to water bath vaporizer 200A.

Gas fueled generator 345 may further be configured to also provide electrical power to hot water pump 402, in addition to providing electrical power to high pressure LNG pump 351, fuel gas compressor 348, and/or combustion air blower 211.

Figure 7:
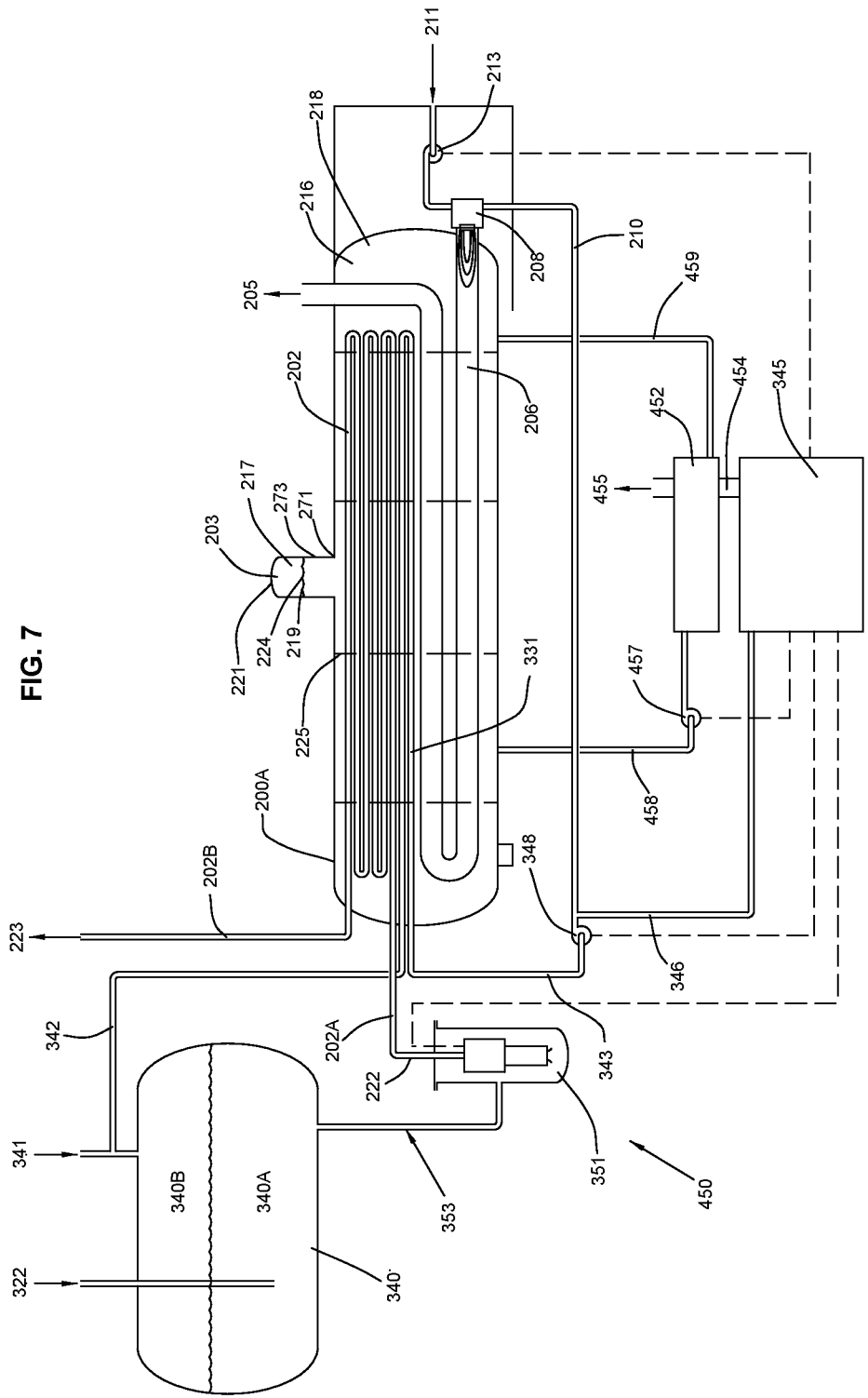
FIG. 7 is a schematic representation of marinized vaporization system 450 that includes many features that are the same or similar to those of the marinized vaporization system 300 of FIG. 4, marinized vaporization system 370 of FIG. 5, and/or marinized vaporization system 400 of FIG. 6. In this marinized vaporization system 450, combustion exhaust gas stream 454 from gas generator 345 is provided to waste heat recovery unit 452 to heat water stream 458 from water bath vaporizer 200A.

Referring additionally to FIG. 7, there is shown a non-limiting embodiment of marinized vaporization system 450 that includes many features that are the same or similar to those of the marinized vaporization system 300 of FIG. 4, marinized vaporization system 370 of FIG. 5, and/or marinized vaporization system 400 of FIG. 6.

In this marinized vaporization system 450, combustion exhaust gas stream 454 from gas generator 345 is provided to waste heat recovery unit 452 to heat water stream 458 from water bath vaporizer 200A. Water stream 458 from water bath vaporizer 450 is pumped by circulation pump 457 to waste heat recovery unit, where it is heated by exhaust stream 454. The resulting heated water stream 459 returns to water bath vaporizer, and the resulting combustion exhaust gas stream 455 may be further utilized or vented.

Gas fueled generator 345 may further be configured to also provide electrical power to water circulation pump 457, in addition to providing electrical power to high pressure LNG pump 351, fuel gas compressor 348, and/or combustion air blower 211.

Figure 10:
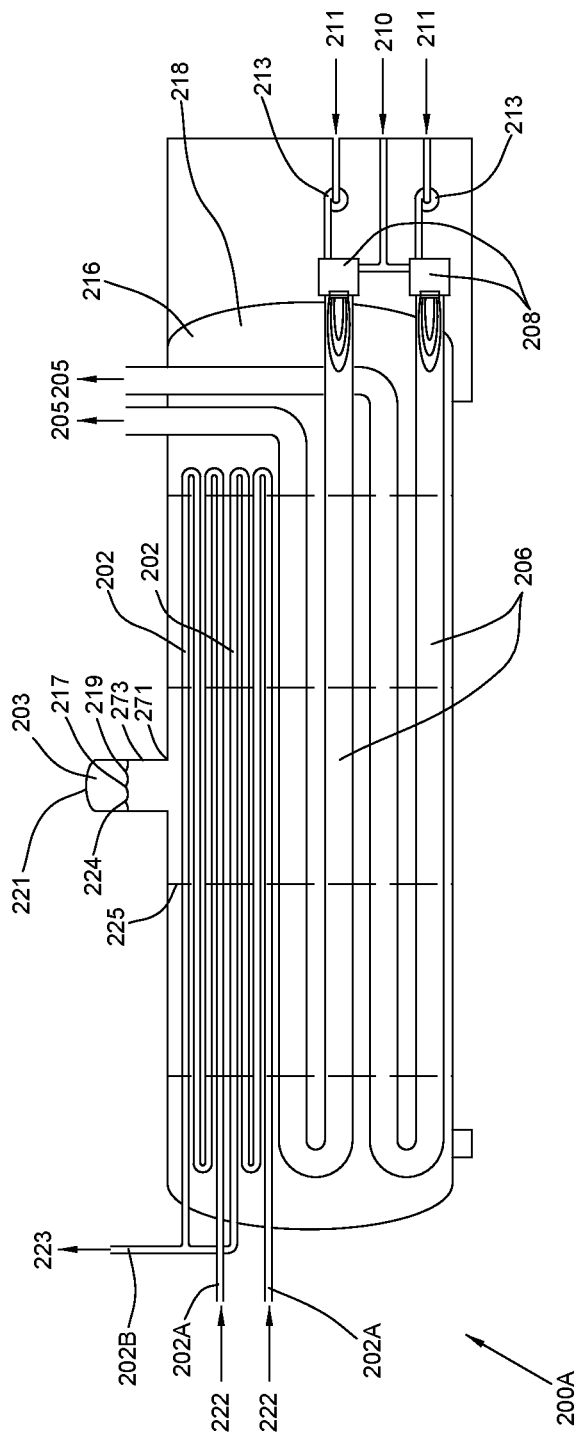
FIG. 10 is a schematic representation of marinized vaporization system 200A, which comprises multiple burners 208 and multiple vaporization tubes 202, in what is a modified version of marinized vaporization system 200 of FIG. 2.
Figure 11:
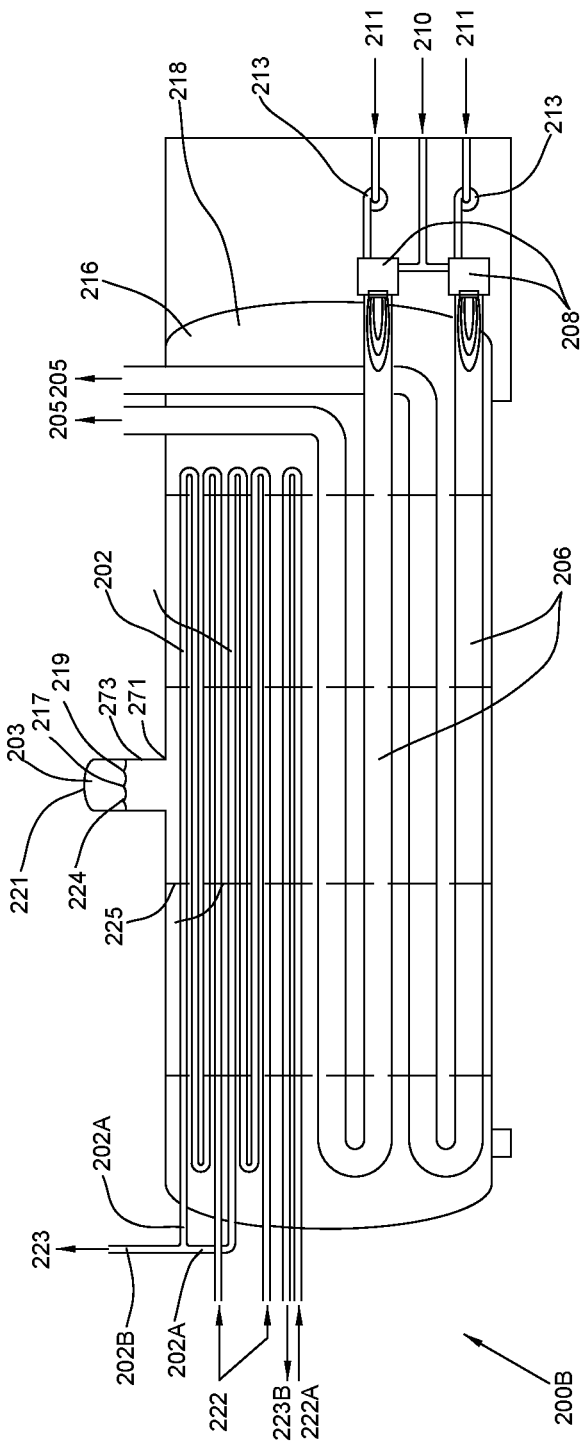
FIG. 11 is a schematic representation of marinized vaporization system 200B, which in addition to having multiple burners 208 and multiple vaporization tubes 202, also includes tube bundle 202A for taking LNG or cold BOG stream 222A to form warm fuel gas stream 223B, in what is a modified version of marinized vaporization system 200 of FIG. 2.

It should also be understood that any of the above non-limiting embodiments may incorporate multiple burners that may or may not be utilized with multiple fire tubes. For example, referring additionally to FIG. 10, there is shown a schematic representation of marinized vaporization system 200A, which comprises multiple burners 208 and multiple vaporization tubes 202, in what is a modified version of marinized vaporization system 200 of FIG. 2. An another example, referring additionally to FIG. 11, there is shown a schematic representation of marinized vaporization system 200B, which in addition to having multiple burners 208 and multiple vaporization tubes 202, also includes tube bundle 202A for taking LNG or cold BOG stream 222A to form warm fuel gas stream 223B, in what is a modified version of marinized vaporization system 200 of FIG. 2.

Figure 12:
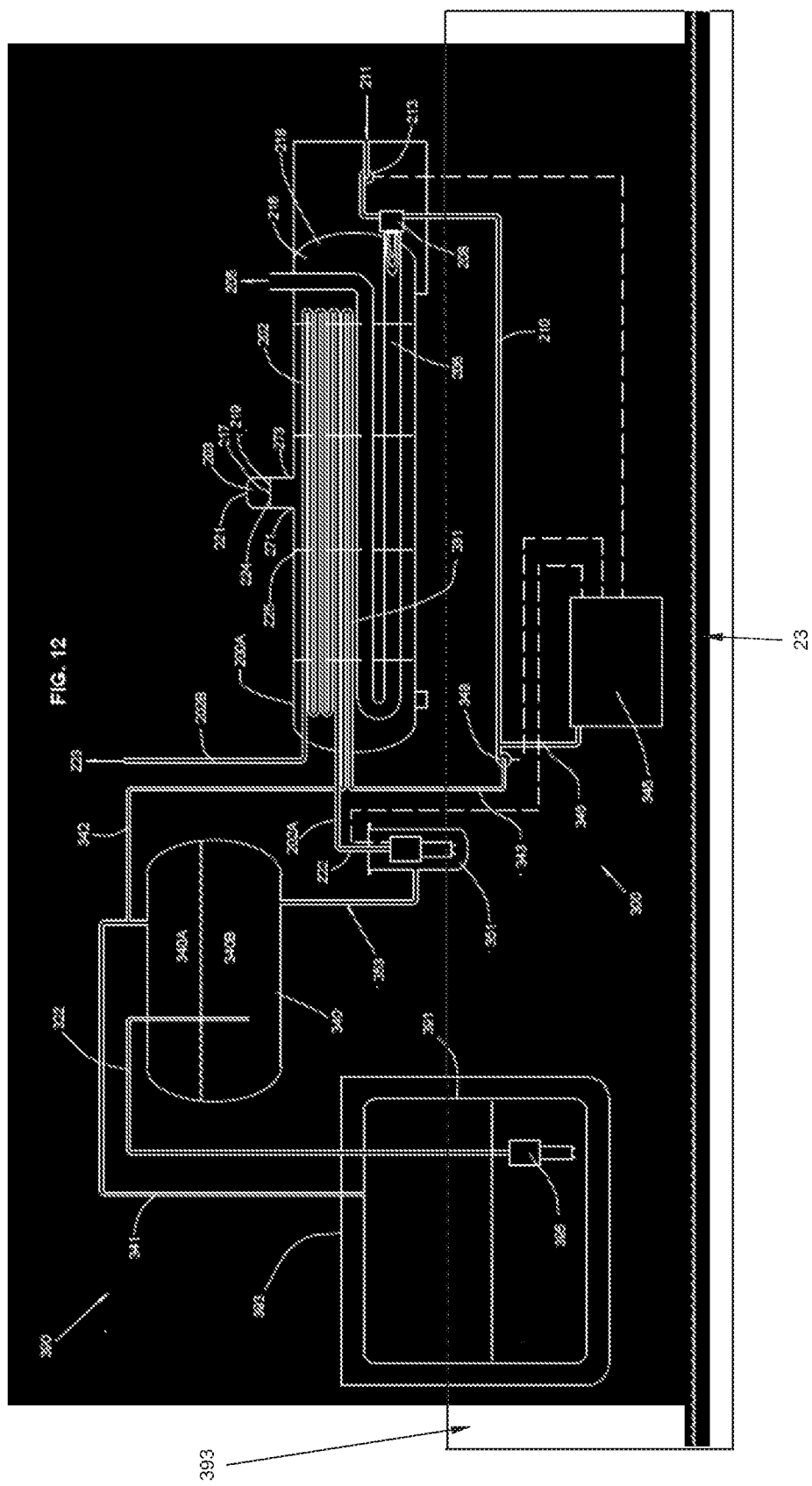
FIG. 12 is a schematic representation of floating marinized vaporization system 390, which includes marinized vaporization system 300 of FIG. 4, and additionally, storage tank 391, transfer pump 395 positioned in storage tank 391 as shown, and floating substrate 393 which supports the entire system. BOG line 341 runs from storage tank 391 to surge tank 340 as shown. LNG line 322 runs from pump 395 to surge tank 340 as shown.

Referring additionally to FIG. 12 there is shown a schematic representation of floating marinized vaporization system 390, which includes marinized vaporization system 300 of FIG. 4, and additionally, storage tank 391, transfer pump 395 positioned in storage tank 391 as shown, and floating substrate 393 which supports the entire system. BOG line 341 runs from storage tank 391 to surge tank 340 as shown. LNG line 322 runs from pump 395 to surge tank 340 as shown.

Figure 13:
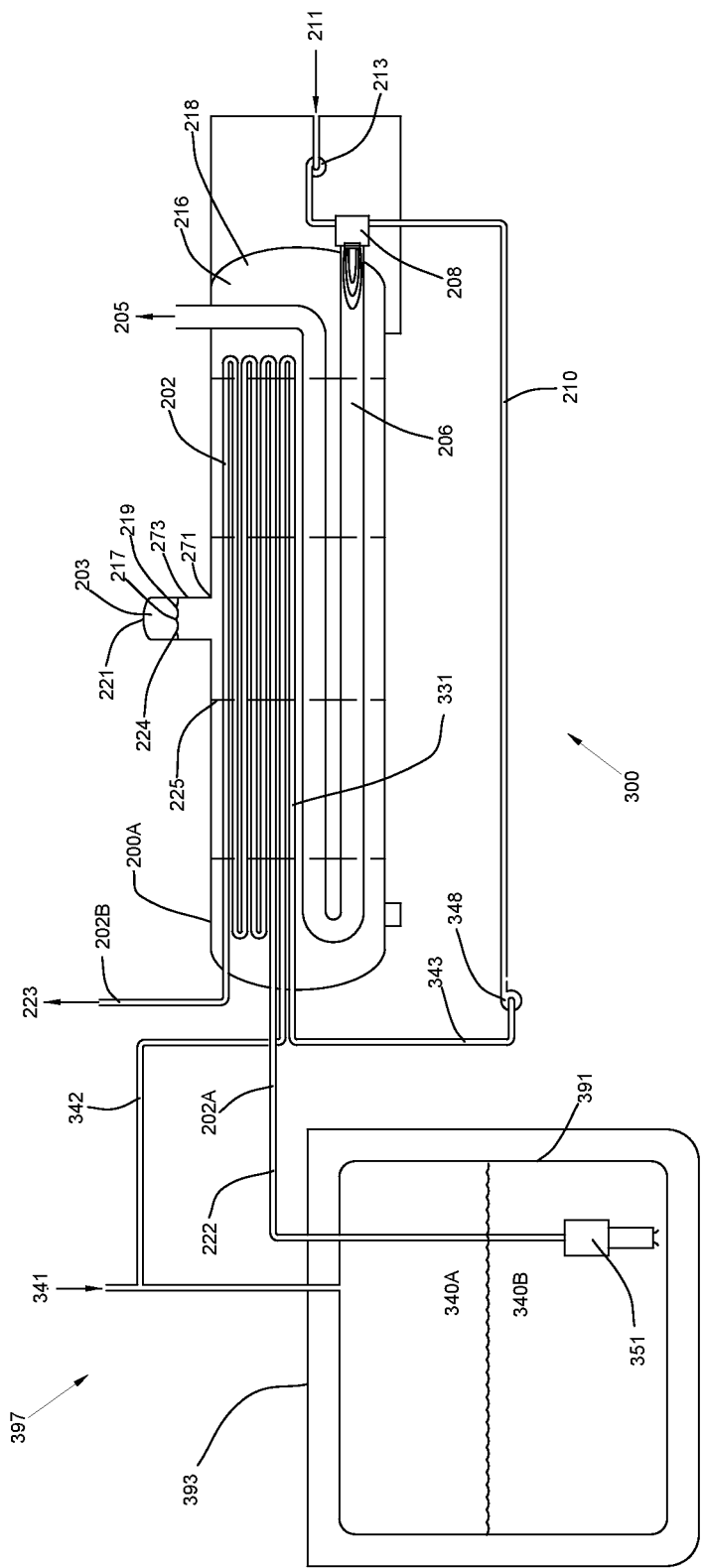
FIG. 13 is a schematic representation of floating marinized vaporization system 397, which is very similar to system 390 of FIG. 12, except that transfer pump 395 has been eliminated with high pressure pump 351 replacing pump 395 in storage tank 391, and surge tank 340 have been eliminated with storage tank 391 now serving as a surge tank. BOG line 341 runs from storage tank 391 directly to cold BOG fuel gas stream 342 as shown. LNG line 322 runs from pump 395 to vaporization coil bundle 202 as shown.

Referring additionally to FIG. 13 there is shown a schematic representation of floating marinized vaporization system 397, which is very similar to system 390 of FIG. 12, except that transfer pump 395 has been eliminated with high pressure pump 351 replacing pump 395 in storage tank 391, and surge tank 340 have been eliminated with storage tank 391 now serving as a surge tank. BOG line 341 runs from storage tank 391 directly to cold BOG fuel gas stream 342 as shown. LNG line 322 runs from pump 395 to vaporization coil bundle 202 as shown.

While these non-limiting embodiments have been illustrated as having a single vaporization coil bundle, it should be understood that multiple vaporization coil bundles may be utilized, and that these multiple coil bundles may or may not being processing the same material. As a non-limiting example, LNG, liquid oxygen, liquid nitrogen, liquid argon, liquid ethylene, liquid ethane, liquid hydrocarbons, liquid CO2, liquid propane, various liquid polymer monomers and/or other cryogenic liquids as desired, including any of the foregoing in super critical phase, may be processed at the same time, in the same water bath vaporizer, but each in different vaporization coil bundles.

While the present invention has been illustrated mainly by reference to LNG, it should be understood that it also finds utility with liquid oxygen, liquid nitrogen, liquid argon, liquid ethylene, liquid ethane, liquid hydrocarbons, liquid CO2, liquid propane, various liquid polymer monomers and/or other cryogenic liquids as desired, including any of the foregoing in super critical phase. Regarding the above non-limiting embodiments of marinized water bath vaporizers and systems as described above and illustrated in FIGS. 2-13, it should be understood that any of the specific features as shown in any of the embodiments may be combined as desired to create even further non-limiting embodiments. In other words, any of the above embodiments may incorporate one or more features from one or more of the other embodiments. Regarding the above non-limiting embodiments of marinized water bath vaporizers and systems as described above and illustrated in FIGS. 2-13, it should be understood that any of the specific features as shown in any of the embodiments may be combined as desired to create even further non-limiting embodiments. In other words, any of the above embodiments may incorporate one or more features from one or more of the other embodiments.

Without being limited, various embodiments of the present invention are believed to be an improvement over the prior art for at least any one of the following reasons.

Regarding Environmental Concerns with the Heat Source, with existing FSRU technology:

Seawater: Directly kills sea life (small fishes, crustaceans and larvae) by impingement on intake screens, chlorination biocides to kill biological life in the seawater piping to eliminate fouling. Locally reduces seawater temperature where it is discharged back into the ocean thereby adversely changing environment for spawning indigenous species. Many environmentally sensitive sites now prohibit the use of seawater heat source for LNG vaporization. However, with various embodiments of the present invention, the present marinized WBVs may be fueled with vaporized LNG or BOG. This improvement totally eliminates the use and permitting requirements for large volumes of seawater and chlorination thereof and does not affect the seawater temperature in anyway.

Regarding the Seawater System, the prior art requires large intake sea chest in the hull, intake screens, chlorination generators, seawater pumps, seawater piping, seawater analyzers and environmental documentation of all aspects of seawater use. However, various embodiments of the present invention eliminates all equipment and systems for the large flow of seawater required for seawater heating for vaporization.

Steam Generation: fueling boilers with heavy fuel oil or marine diesel fuel thereby polluting the air with soot, particulate, oxides of sulfur and nitrogen and unburned hydrocarbon. Inefficient heating of the glycol water intermediate fluid. However, various embodiments of the present inventive Marinized WBVs do not require steam generation or the consumption of HFO or MDO. Marinized WBVs are fueled by sulfur free natural gas from vaporized LNG or BOG. Highly efficient, low NOX burners are used to minimize air pollution associated with vaporizing the LNG.

Regarding using ethylene glycol water as the Intermediate Fluid: the prior art systems require sourcing, handling, storage and potential spill of ethylene glycol that is toxic to sea life. Further, prior art systems require seawater/ethylene glycol water heat exchangers, pumps, filters, piping, drain tanks and blowdown treating. However, various embodiments of the present invention eliminate all equipment and systems associated with ethylene glycol water intermediate fluid.

Regarding using propane as the intermediate Fluid: Prior art systems require the sourcing, handline, storage and use of the intoxicant and highly flammable and explosive hydrocarbon. Furthermore, significant safeguards are required to mitigate risks. However, various embodiments of the present invention eliminate all equipment and systems associated with propane intermediate fluid.

Regarding steam system integration, the prior art systems require a significant integration of ship steam system incurring significant complexity, cost and schedule. However, with various embodiments of the present invention the marinized WBVs utilize no steam or steam condensate thereby eliminating any integration requirement for the steam system.

Regarding electrical system integration, the prior art systems require powering of the seawater pumps, LNG pumps and BOG compressors requires significant increase in power generation, switchgear, motor controls into the ship electrical power system control systems into the ship incurring significant complexity, cost and schedule. However, with various embodiments of the present invention the marinized WBVs require no integration into the ships electrical system. This allows ship owners the option of totally isolating the power generation from the ship systems and operate independent of the ship systems. This also allows shipyards and LNGC owners to add regas as a simple option to any LNGC order or make a very simple conversion of the LNG by the addition of prefabricated regas module with all required power generation included.

Regarding integration with LNG and vapor system, the prior art requires significant integration with ship containment, LNG and vapor systems. Often requiring entry and installation of LNG pumps and piping into the LNGC containment tanks and additional deck piping to the vaporizers. However, with various embodiments of the present invention, the marinized WBVs require minimum integration in the ship containment LNG and vapor systems. The WBV system requires only simple, above deck connections to the LNG and vapor manifold piping.

While the present invention has been described as being useful for processing LNG and vaporizing it into natural gas, it should be understood that the present invention is also useful for vaporizing any liquid into a gas/vapor. Such liquids include those that are liquids at ambient conditions, or those that are liquids at non-ambient conditions including cryogenic liquids.

Some non-limiting embodiments of the present invention provide for vaporizing systems that may include may utilize any type of vaporizers, including water bath vaporizers, submerged combustable vaporizers, open rack vaporizers, shell & tube vaporizers, ambient air vaporizers, direct electric vaporizers, steam vaporizers and water pot vaporizers.

Some non-limiting embodiments of the present invention provide for marinized vaporizing systems that may include may utilize any type of marinized vaporizers, including marinized water bath vaporizers, marinized submerged combustable vaporizers, marinized open rack vaporizers, marinized shell & tube vaporizers, marinized ambient air vaporizers, marinized direct electric vaporizers, marinized steam vaporizers and marinized water pot vaporizers.

Some non-limiting embodiments of the present invention provide for a small footprint vaporizing system as described herein.

Some non-limiting embodiments of the present invention provide for a floating system that includes at least the vaporizing system as described herein.

Some non-limiting embodiments of the present invention provide for floating storage and regas vessel, which includes at least the vaporizing system as described herein.

Some non-limiting embodiments of the present invention provide for a tank with reduced/minimized sloshing surface as described herein.

Some non-limiting embodiments of the present invention provide for a tank (as described herein) that is supported on a ship, FSR, barge, platform, semi-submersible, marine vessel, etc.

Some non-limiting embodiments of the present invention provide for a converted marine vessel that includes that includes the vaporizing system as described herein and/or any of the other modifications as described herein.

Some non-limiting embodiments of the present invention provide for converted vaporizing unit that includes at least one of the modifications described herein.

Some non-limiting embodiments of the present invention provide for larger systems (i.e., terminal, pipeline, processing facility, transportation system, etc) that includes any of the systems, vessels or units described herein.

Some non-limiting embodiments of the present invention provide for methods of making any of the systems, vessels or units described herein.

Some non-limiting embodiments of the present invention provide for methods of using/operating any of the systems, vessels or units described herein.

Some non-limiting embodiments of the present invention provide for methods of processing a liquid utilizing any of the systems, vessels or units described herein.

Some non-limiting embodiments of the present invention provide for methods of converting a marine vessel, that includes adding the vaporizing system as described herein and/or making any of the other modifications as described herein.

Some non-limiting embodiments of the present invention provide for a method of converting a vaporizing unit that includes making at least one of the modifications as described herein.

Some non-limiting embodiments of the present invention provide for methods of processing LNG using any of the systems, vessels or units as described herein.

Some non-limiting embodiments of the present invention provide for methods of processing LNG while in transport utilizing any apparatus/methods of the present invention.

Some non-limiting embodiments of the present invention provide for processed LNG and/or natural gas obtained by/with any of the systems, vessels, units or methods as described herein.

Some non-limiting embodiments of the present invention provide for any and all methods, apparatus, and/or products, and/or any parts or portions thereof, all as disclosed and described herein.

The foregoing is considered as illustrative only of the principles of the present invention. Further, since numerous modifications and changes will readily occur to those skilled in the art, it is not desired to limit the present invention to the exact construction and operation shown and described.

Those skilled in the art will recognize other embodiments of the present invention which may be drawn from the illustrations and the teachings herein. To the extent that such alternative embodiments are so drawn, it is intended that they shall fall within the ambit of protection of the claims appended hereto.

Having disclosed the present invention in the foregoing specification and accompanying drawings in such a clear and concise manner, those skilled in the art will readily understand and easily practice the present invention.

I claim:

1. A floating marinized water bath vaporizer comprising:
A. A floating substrate floating in a body of water;
B. a water vaporizer chamber supported by the substrate and having a water vaporizer chamber horizontal cross-sectional area;
C. a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area;
D. water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inface being substantially equal to the water vapor chamber horizontal cross-sectional area;
E. heating system providing heat to the water bath;
F. a vaporizer heat exchange loop immersed in said water vaporizer chamber and immersed in said water bath, said loop having an inlet end and an outlet end;
G. an inlet pipe extending from outside the vaporizer chamber to connect with the inlet end of said heat transfer loop to carry a fluid to be heated into said loop; and,
H. an outlet pipe extending from said outlet ends to the outside of the vaporizer chamber to carry said fluid away from said loop after it has been heated.

2. A travelling floating marinized water bath vaporizer comprising:
A. A travelling floating substrate travelling on a body of water;

B. a water vaporizer chamber supported by the substrate and having a water vaporizer chamber horizontal cross-sectional area;

C. a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area;

D. water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inface being substantially equal to the water vapor chamber horizontal cross-sectional area;

E. heating system providing heat to the water bath;

F. a vaporizer heat exchange loop immersed in said water vaporizer chamber and immersed in said water bath, said loop having an inlet end and an outlet end;

G. an inlet pipe extending from outside the vaporizer chamber to connect with the inlet end of said heat transfer loop to carry a fluid to be heated into said loop; and, H. an outlet pipe extending from said outlet ends to the outside of the vaporizer chamber to carry said fluid away from said loop after it has been heated.

3. An anchored floating marinized water bath vaporizer comprising:

A. An anchored floating substrate anchored in a body of water;

B. a water vaporizer chamber supported by the substrate and having a water vaporizer chamber horizontal cross-sectional area;

C. a sloshing chamber in liquid communication with and positioned on top of the water vaporizer chamber, wherein at a selected fill level the sloshing chamber has a sloshing horizontal cross-sectional area that is substantially less than the water vaporizer horizontal cross-sectional area;

D. water bath filling said water vaporizer chamber and said sloshing chamber such that the water vaporizer chamber is substantially full of water with the sloshing chamber partially filled with water to the selected fill level with a horizontal water-vapor interface created in the sloshing chamber at the selected fill level, with the surface area of the water at the inface being substantially equal to the water vapor chamber horizontal cross-sectional area;

E. heating system providing heat to the water bath;

F. a vaporizer heat exchange loop positioned in said water vaporizer chamber and immersed in said water bath, said loop having an inlet end and an outlet end;

G. an inlet pipe extending from outside the vaporizer chamber to connect with the inlet end of said heat transfer loop to carry a fluid to be heated into said loop; and, H. an outlet pipe extending from said outlet ends to the outside of the vaporizer chamber to carry said fluid away from said loop after it has been heated.

4. A method of vaporizing a liquid, in a water vaporizer chamber supported by a floating substrate floating in a body of water, the water vaporizing chamber having a water vaporizer chamber horizontal cross-sectional area with a sloshing chamber in liquid communication with and positioned on top of the water vaporizer chamber, wherein the sloshing chamber has a sloshing horizontal cross-sectional area that is substantially less than the water vaporizer horizontal cross-sectional area, wherein a water bath fills said water vaporizer chamber and said sloshing chamber such that the water vaporizer chamber is substantially full of water with the sloshing chamber partially filled with water with a horizontal water level created in the sloshing chamber, with a vaporizer heat exchange loop positioned in said water vaporizer chamber and surrounded by said water bath, the method comprising:

A. Circulating the liquid through the vaporizer heat exchange loop to vaporize the liquid.

5. The method of claim 4, wherein the sloshing chamber has a sloshing horizontal cross-sectional area that is less than 25% of the water vaporizer horizontal cross-sectional area.

6. The method of claim 4, wherein the sloshing chamber has a sloshing horizontal cross-sectional area that is less than 10% of the water vaporizer horizontal cross-sectional area.

7. The method of claim 4, wherein the sloshing chamber has a sloshing horizontal cross-sectional area that is less than 5% of the water vaporizer horizontal cross-sectional area.

8. A method of vaporizing multiple liquids, in a water vaporizer chamber supported by a floating substrate floating in a body of water, the water vaporizing chamber having a water vaporizer chamber horizontal cross-sectional area with a sloshing chamber in liquid communication with and positioned on top of the water vaporizer chamber, wherein the sloshing chamber has a sloshing horizontal cross-sectional area that is substantially less than the water vaporizer horizontal cross-sectional area, wherein a water bath fills said water vaporizer chamber and said sloshing chamber such that the water vaporizer chamber is substantially full of water with the sloshing chamber partially filled with water with a horizontal water level created in the sloshing chamber, with multiple vaporizer heat exchange loops immersed in said water vaporizer chamber and surrounded by said water bath, the method comprising:

A. Circulating each of the multiple liquids though at least one of the multiple vaporizer heat exchange loops to vaporize the liquid.

9. The method of claim 8, wherein the sloshing chamber has a sloshing horizontal cross-sectional area that is less than 25% of the water vaporizer horizontal cross-sectional area.

10. The method of claim 8, wherein the sloshing chamber has a sloshing horizontal cross-sectional area that is less than 10% of the water vaporizer horizontal cross-sectional area.

11. The method of claim 8, wherein the sloshing chamber has a sloshing horizontal cross-sectional area that is less than 5% of the water vaporizer horizontal cross-sectional area.

* * * * *